Patented Oct. 17, 1922.

1,432,295

UNITED STATES PATENT OFFICE.

GEORGE LAIRD, OF CEDAR RAPIDS, IOWA, ASSIGNOR TO THE QUAKER OATS COMPANY, OF CHICAGO, ILLINOIS, A CORPORATION OF NEW JERSEY.

ANIMAL FEED AND PROCESS OF MAKING THE SAME.

No Drawing. Application filed August 11, 1921. Serial No. 491,518.

*To all whom it may concern:*

Be it known that I, GEORGE LAIRD, a citizen of the United States, residing at Cedar Rapids, in the county of Linn and State of Iowa, have invented new and useful Improvements in Animal Feeds and Processes of Making the Same, of which the following is a full, clear, concise, and exact description, reference being had to the accompanying drawing, forming a part of this specification.

This invention has to do with an improved animal feed, and the process of producing it.

It has for an object the production from molasses and dusty, artificially dried by-product materials of a feed in which the moisture content is substantially that of the original grain from which the by-product was manufactured, and in which finished feed the objectionable dustiness of the by-product has been entirely eliminated.

It has for a further object the production of a molasses feed of greatly improved keeping quality.

Another object is the production of substantially dry feed from wet materials such as molasses, without additional drying of the feed mixture.

Other objects and advantages will appear herein.

It is well known that the by-product from the manufacture of rolled oats commonly known as "oat meal mill by-product" has a very low moisture content, normally less than 5 per cent, and that in addition it carries a considerable percentage of very finely divided portions of the oat kernel which gives it a dusty nature. This dustiness, combined with the extremely low moisture content compared with other feed stuff commonly used, makes it relatively unpalatable to live stock, probably because it rapidly absorbs the saliva when taken into the mouth, and so gives a dry, unnatural, and consequently unpleasant feeling or taste. I am aware that in the past, this material has been utilized for live stock feeding by mixing it with considerable quantities of other dry feeding materials as well as by mixing it with large quantities of sticky materials such, for example, as black strap molasses, into comparatively plastic or sticky products known as molasses feeds. The dry feeds have been difficult to make palatable, and the molasses feeds, because of their relatively high moisture content and their tendency to pack into solid masses, have been subject to spontaneous heating and even spontaneous combustion and considerable losses have resulted therefrom.

By my improved process and product I obviate all these difficulties. I produce from the relatively unpalatable oat meal mill by-product a highly palatable feed of permanent keeping quality, of excellent value for live stock feeding which product is no longer dusty because the molasses is thoroughly and uniformly distributed through it, coating every particle of dust, and binding these tiny particles into larger aggregates, thus eliminating entirely the objectionable dustiness.

In manufacturing my improved product, I may use only oat meal mill by-product and molasses, but preferably I mix with these two ingredients, other feeding materials of such chemical nature as to produce a nutritively balanced finished feed.

In practicing my process, I feed the oat meal mill by-product of known moisture content into any suitable mixing device and add to it just enough molasses, also of known moisture content to replace the water artificially removed from the oat product and produce a finished mixture containing substantially the same percentage of moisture as was contained in the original oat kernel, which is between 10 and 12%. Under ordinary conditions, these conditions would be satisfied by the addition of approximately 200 pounds of black strap molasses to approximately 575 pounds of oat meal mill by-product. These two materials are as thoroughly mixed as possible, either with or without heating, but no mixing device with which I am acquainted can be used with complete success for this purpose. Despite the most efficient mixing, the mixture will contain large numbers of tiny balls or pellets in which an excessive quantity of molasses is present, and which, if allowed to remain in the feed in that form, may be the cause of spontaneous heating and consequent deterioration of the feed. After the mixing just referred to has been made as thorough as possible in the ordinary mixer, the additional material, such for example as bran, alfalfa meal, hominy feed, cotton seed meal, and the like are added, and the mixing continued for a short time. At this point I find it possible by the introduction of an additional step to the process to eliminate the objectionable pellets entirely. This step consists in transferring the whole mass to a mill and grinding it thoroughly, which would not be possible if the percentage of molasses were increased to any considerable extent, yet which, under the conditions I have worked out, serves to remove all the objectionable lumps and pellets, and produces a finished feed uniformly homogeneous and of superior quality.

Instead of proceeding as described I may first mix all the dry ingredients including the oat meal mill by-product. Where this procedure is adopted, I next add the molasses to the totality of the intimately mixed dry ingredients, continue the mixing for an additional period, and ultimately grind the lumpy mixture as first described.

These are alternative courses of procedure involving substantially the same process and producing substantially the same product. The selection of the one to be used in any specific plant will depend on the type of mechanical equipment available. It will be obvious that the principle of my invention may be applied to combinations of material other than oat meal mill by-product and molasses, and I do not desire to limit my invention merely to these two products. Yet it is especially adapted to that specific combination.

Having described my invention what I claim as new and desire to secure by Letters Patent, is:

1. The process of making a feed from oat meal mill by-product which comprises adding to said by-product a sufficient quantity of molasses to restore the moisture removed from said by-product during the manufacturing process to which it has been previously subjected.

2. The process of making a feed comprising oat meal mill by-product which consists in adding to the oat meal mill by-product a quantity of molasses sufficient to restore the moisture artificially removed from it in the oat milling process, thoroughly mixing these materials and ultimately milling the product to produce homogeneity.

3. The process of making a balanced ration for live stock, which consists in adding to a mixture of feedstuff comprising oat meal mill by-product a sufficient quantity of molasses to restore the moisture lost by the oat meal mill by-product during the process of oat milling, then mixing these ingredients and ultimately milling the product to promote homogeneity.

In witness whereof, I have hereunto subscribed my name.

GEORGE LAIRD.

Witnesses:
   H. E. MUZZY,
   ARTHUR POE.